United States Patent
Buelthoff et al.

(10) Patent No.: US 8,634,969 B2
(45) Date of Patent: Jan. 21, 2014

(54) TELEOPERATION METHOD AND HUMAN ROBOT INTERFACE FOR REMOTE CONTROL OF A MACHINE BY A HUMAN OPERATOR

(75) Inventors: Heinrich H. Buelthoff, Tuebingen (DE); Paolo Robuffo Giordano, Tuebingen (DE)

(73) Assignee: Max-Planck-Gesellschaft zur Foerderung der Wissenschaften e.V. (DE)

( * ) Notice: Subject to any disclaimer, the term of this patent is extended or adjusted under 35 U.S.C. 154(b) by 0 days.

(21) Appl. No.: 13/256,438

(22) PCT Filed: Mar. 17, 2009

(86) PCT No.: PCT/EP2009/001964
§ 371 (c)(1),
(2), (4) Date: Sep. 13, 2011

(87) PCT Pub. No.: WO2010/105638
PCT Pub. Date: Sep. 23, 2010

(65) Prior Publication Data
US 2012/0004791 A1    Jan. 5, 2012

(51) Int. Cl.
*G05D 3/12*    (2006.01)

(52) U.S. Cl.
USPC ............... 701/2; 700/264; 434/44; 434/45; 434/59

(58) Field of Classification Search
USPC ............ 701/2; 700/245, 264; 434/30, 38, 44, 434/45, 59
See application file for complete search history.

(56) References Cited

U.S. PATENT DOCUMENTS

| | | | |
|---|---|---|---|
| 5,865,624 A | 2/1999 | Hayashigawa | |
| 5,904,724 A | 5/1999 | Margolin | |
| 6,694,228 B2* | 2/2004 | Rios | 701/2 |
| 7,099,752 B1 | 8/2006 | Lenell et al. | |
| 7,693,624 B2* | 4/2010 | Duggan et al. | 701/24 |
| 7,885,732 B2* | 2/2011 | Troy et al. | 701/2 |
| 8,255,092 B2* | 8/2012 | Phillips et al. | 701/2 |
| 2003/0212478 A1* | 11/2003 | Rios | 701/2 |
| 2007/0009861 A1 | 1/2007 | Heinrich | |
| 2008/0063400 A1* | 3/2008 | Hudson et al. | 398/106 |

FOREIGN PATENT DOCUMENTS

| | | |
|---|---|---|
| CN | 1356675 A | 7/2002 |
| CN | 101093617 A | 12/2007 |
| EP | 1605421 A2 | 12/2005 |

OTHER PUBLICATIONS

Lee et al, Effects of Haptic Feedback, Stereoscopy, and Image Resolution on Performance and Presence in Remote Navigation, International Journal of Human-Computer Studies, vol. 66, Iss. 10, Oct. 2008, pp. 701-717.*

(Continued)

*Primary Examiner* — Russell Frejd
(74) *Attorney, Agent, or Firm* — Caesar, Rivise, Bernstein, Cohen & Pokotilow, Ltd.

(57) ABSTRACT

The invention relates to a teleoperation method and a human robot interface for remote control of a machine by a human operator (5) using a remote control unit, particularly for remote control of a drone, wherein a vestibular feedback is provided to the operator (5) to enhance the situational awareness of the operator (5), wherein the vestibular feedback represents a real motion of the remote-controlled machine.

19 Claims, 3 Drawing Sheets

(56) References Cited

OTHER PUBLICATIONS

Hing et al., "Development of an Unmanned Aerial Vehicle Piloting System with Integrated Motion Cueing for Training and Pilot Evaluation", J Intell Robot Syst., vol. 54, No. 1-3, pp. 3-19 (2008).

Levine et al., "An Onboard Pilot and Remote Copilot for Aviation Safety, Security & Cost Savings", Digital Avionics Systems Conference, pp. 4.E.5-1-4.E.5-13 (2007).

Teufel et al., "MPI Motion Simulator: Development and Analysis of a Novel Motion Simulator", AIAA Modeling and Simulation Technologies Conference and Exhibit, Aug. 20-23, 2007, Hilton Head, South Carolina—http://kyb.tuebingen.mpg.de/publications/attachments/Teufel2007_4 5012[0].pdf (2007), pp. 1-11.

Troy et al., "Haptics-Enabled UAV Teleoperation Using Motion Capture Systems", Journal of Computing and Information Science in Engineering, vol. 9, No. 1, pp. 11003-1-11003-7 (2009).

International Search Report for PCT/EP2009/001964 dated Dec. 21, 2009.

Computer generated translation of CN1356675.

Computer generated translation of CN101093617.

\* cited by examiner

TELEOPERATION METHOD AND HUMAN ROBOT INTERFACE FOR REMOTE CONTROL OF A MACHINE BY A HUMAN OPERATOR

FIELD OF THE INVENTION

The invention relates to a teleoperation method for remote control of a machine by a human operator using a remote control unit, particularly for remote control of an unmanned aerial vehicle (UAV).

Further, the invention relates to a human robot interface (HRI) for the use in the afore-mentioned teleoperation method.

BACKGROUND OF THE INVENTION

In modern warfare, so-called unmanned aerial vehicles (UAVs) are used in reconnaissance missions and even in combat missions. These UAVs are generally remote controlled by an operator who is connected with the UAV via a wireless radio communication link. However, in such a remote control scenario, a poor situational awareness of the operator can lead to wrong reactions and, in the worst case, complete loss of the vehicle.

Therefore, the conventional teleoperation methods for remote-control of UAVs are unsatisfactory since they often lead to wrong reactions of the operator and a considerable number of total vehicle losses.

SUMMARY OF THE INVENTION

It is therefore an object of the invention to improve the afore-mentioned conventional teleoperation method for remote control of an UAV.

It is a further object of the invention to provide a human robot interface (HRI) for use in the novel teleoperation method.

These objects are achieved by a novel teleoperation method and a corresponding human robot interface according to the independent claims.

The inventors have recognized that the afore-mentioned losses of remote-controlled UAVs are mainly caused by a poor situational awareness of the operator. Therefore, the invention improves the situational awareness of the operator by providing a vestibular feedback to the operator.

The vestibular feedback is preferably provided to the operator by subjecting the operator to a motion corresponding to the motion of the remote-controlled machine so that the operator feels substantially the same vestibular sensations as if the operator would be on board the remote-controlled machine (e.g. a UAV). However, the term vestibular feedback as used in the context of this invention is not restricted to embodiments in which the operator performs substantially the same motion as the remote-controlled machine. It is rather possible that the vestibular feedback provided to the operator merely comprises a motion of the operator in less than three degrees of freedom. For example, it is possible that the operator undergoes a motion relating to the pitch angle and the roll angle while the yaw angle is fixed. Further, it is possible that the vestibular feedback merely reproduces the spatial orientation of the remote-controlled machine while the accelerations of the remote-controlled machine are not reproduced by the vestibular feedback provided to the operator. However, it is preferred that the vestibular feedback reproduces a motion of the operator which is as similar as possible to the real motion of the remote-controlled machine.

The novel teleoperation method preferably comprises a step of determining vestibular data representing the real motion of the remote-controlled machine. Then, the vestibular feedback is determined on the basis of the vestibular data of the remote-controlled machine. The operator is then subjected to a motion corresponding to the motion of the remote-controlled machine, wherein the motion of the operator provides the vestibular feedback and is generated according to the vestibular data of the remote-controlled machine.

There are several different options for determining the vestibular data needed for generating the vestibular feedback.

In one embodiment of the invention, the vestibular data representing the real motion of the remote-controlled machine are measured by onboard sensors of the remote-controlled machine. For example, there can be gyroscopes and accelerometers on board the UAV wherein these sensors measure the vestibular data in the form of the attitude of the remote-controlled machine (e.g. pitch angle, roll angle, yaw angle, linear coordinates), speed and acceleration of the UAV. The vestibular data measured by the onboard sensors are then transmitted from the remote-controlled machine to the remote control unit via a communication link, e.g. a wireless radio communication link.

In another embodiment of the invention, the vestibular data representing the real motion of the remote-controlled machine are remotely measured by a fixed motion tracking system so that it is not necessary to transmit the vestibular data from the remote-controlled machine via the wireless link to the remote control unit. Suitable motion tracking systems are commercially available, for example, from the company Vicon Motion Systems so that no further explanation of the motion tracking system is necessary.

Further, the vestibular data can be calculated by a mixture of the afore-mentioned alternatives. For example, raw data can be measured by onboard sensors. Then, the raw data are transmitted to the remote control unit where they are used, for example, to update a dynamic model of the remote controlled machine.

In another embodiment of the invention, the vestibular data representing the real motion of the remote-controlled machine are not measured at all but derived from motion commands which are sent from the remote control unit to the remote-controlled machine. In other words, the vestibular data can be calculated on the basis of the motion command signals considering a dynamic model of the behaviour of the remote-controlled machine.

In a preferred embodiment of the invention, the vestibular feedback is provided to the operator by a robot carrying the operator. The robot is preferably a multi-axis serial manipulator comprising several links connected by joints. Such a multi-axis robot is commercially available, for example, from the German company KUKA Roboter GmbH under the trademark Robocoaster®. However, the invention can also be realized with other types of robots from different manufacturers. Alternatively, the robot can be a parallel manipulator, particularly a so-called Stewart platform.

In the preferred embodiments, the invention additionally provides other types of feedback to the operator, e.g. a visual feedback, an acoustical feedback and/or a haptic feedback to further enhance the situational awareness of the operator.

There are different options for providing the visual feedback to the operator. In one embodiment of the invention, a virtual scenery is calculated on the basis of the vestibular data of the remote-controlled machine. Then, the virtual scenery is displayed to the operator.

In another embodiment of the invention, the remote-controlled machine (e.g. a UAV) comprises an onboard camera taking pictures from the perspective of the remote-controlled machine. Then, these images are transmitted via the communication link to the remote control unit where the images are displayed to the operator.

It has already been mentioned that there is preferably a communication link between the remote-controlled machine and the remote control unit. The communication link is preferably a wireless link, e.g. a radio communication link, an infra-red remote control link or an ultrasonic remote control link. However, the communication link between the remote-controlled machine and the remote control unit can also be a wire-bound communication link. For example, the remote-controlled machine and the remote control unit can be interconnected by an optical fibre or an electrical cable.

Further, it has already been mentioned that the vestibular data preferably comprise the attitude of the remote-controlled machine, particularly pitch angle, roll angle, yaw angle and/or linear coordinates of the remote-controlled machine. Further, the vestibular data may comprise the speed of the remote-controlled machine, particularly temporal changes of pitch angle, roll angle and/or yaw angle of the remote-controlled machine. Moreover, it is possible that the vestibular data comprise accelerations of the remote-controlled machine, particularly accelerations of the pitch angle, the roll angle and/or the yaw angle of the remote-controlled machine. In other words, the vestibular data preferably comprise all motion data of the remote-controlled machine which are necessary to reproduce an almost identical motion of the operator.

In a preferred embodiment of the invention, the remote-controlled machine is an unmanned aerial vehicle (UAV) which has already been mentioned above. However, it is alternatively possible that the remote-controlled machine is an unmanned ground vehicle (UGV), particularly an unmanned ground combat vehicle (UGCV). Further applications of the inventions comprise the remote control of remotely operated underwater vehicles or unmanned spacecrafts. Moreover, the invention can be useful in the field of medical technology to navigate a so-called nanorobot through the body of an animal being.

In the preferred embodiment of the invention, the vestibular data are filtered before determining the vestibular feedback on the basis of the filtered vestibular data, wherein the filtering of the vestibular data ensures that the vestibular feedback provided to the operator complies with safety restrictions and/or mechanical restrictions. For example, if a remote-controlled UAV collides with another flying object or with ground, it is not desirable to reproduce the crash of the UAV in the vestibular feedback since the vestibular feed-back device (e.g. robot) and the operator would be mechanically overstrained by the reproduction of the crash.

It should further be noted that the invention is not restricted to the afore-mentioned novel teleoperation method. The invention rather comprises a corresponding human robot interface (HRI) for use in the afore-mentioned teleoperation method. The novel human robot interface is characterized in that it provides a vestibular feedback to the operator to enhance the situational awareness of the operator, wherein the vestibular feedback represents the real motion of the remote-controlled machine.

In the preferred embodiment of the invention, the human robot interface comprises a receiver for receiving vestibular data from the remote-controlled object, where the vestibular data are determined by onboard sensors as mentioned above. Further, the human robot interface preferably comprises a controller for determining the suitable vestibular feedback on the basis of the vestibular data received from the remote-controlled machine via the communication link. Moreover, the human robot interface according to the invention preferably comprises a vestibular feedback device for providing the vestibular feedback to the operator.

The vestibular feedback device is preferably a robot, e.g. a serial manipulator or a parallel manipulator.

The afore-mentioned robot used as a vestibular feedback device carries the operator so that the robot can reproduce the real motion of the remote-controlled machine. The robot preferably also carries a visual feedback device, particularly a display screen or a projection system, providing a visual feedback to the operator wherein the generation of the visual feedback has already been described above. To further enhance the situational awareness of the operator, the robot preferably also carries an acoustic feedback device providing an acoustic feedback to the operator and a haptic feedback device providing a haptic feedback to the operator. The operator can sit on a seat which is carried by the robot wherein the operator can handle a control stick or a similar control device for generating motion commands which are transmitted to the remote-controlled machine for controlling the real motion of the remote-controlled machine.

The afore-mentioned system can be used for the training of pilots of vehicles, particularly of aircrafts or spacecrafts. However, the invention is not restricted to the applications disclosed in this description.

The invention and its particular features and advantages will become apparent from the following detailed description considered with reference to the accompanying drawings.

DETAILED DESCRIPTION OF THE DRAWINGS

Figure 1:
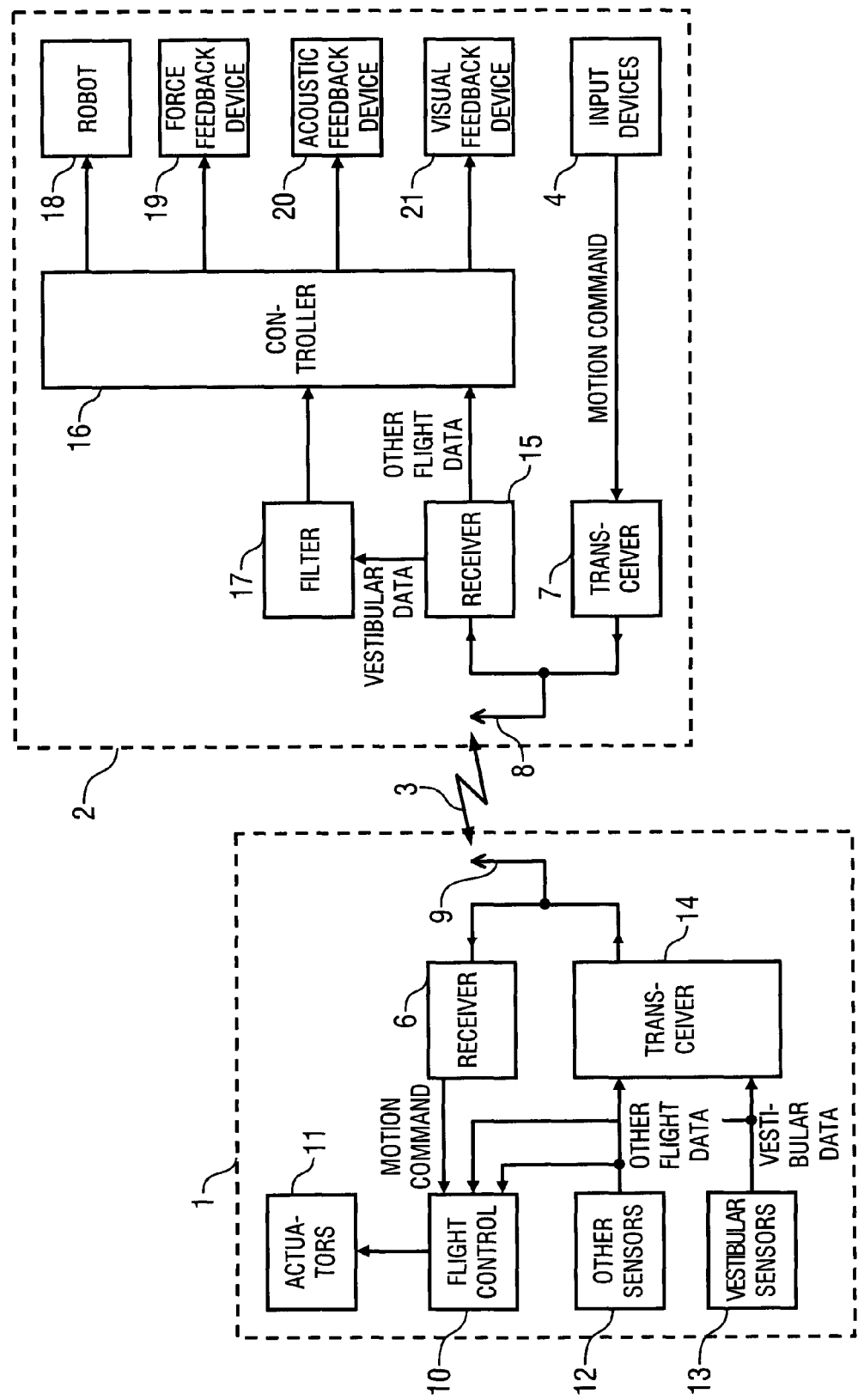
FIG. 1 is a diagram showing a teleoperation system comprising a remote-controlled machine and a remote control unit interconnected by a wireless communication link wherein the remote control unit provides a vestibular feedback to the operator thereby enhancing the situational awareness of the operator.

FIG. 1 shows a schematic diagram of a human robot interface (HRI) for remote control of an unmanned aerial vehicle (UAV) 1 by a remote control unit 2, wherein the unmanned aerial vehicle 1 and the remote control unit 2 are interconnected by a wireless radio communication link 3.

The remote control unit 2 comprises input devices 4, e.g. control sticks, pedals. An operator 5 (cf. FIG. 3) handles the input devices 4 thereby generating motion commands defining a desired motion of the unmanned aerial vehicle 1.

The motion commands are sent to a receiver 6 in the unmanned aerial vehicle 1 via a transceiver 7 and an antenna 8 of the remote control unit 2, the radio communication link 3 and an antenna 9 in the unmanned aerial vehicle 1.

The receiver 6 forwards the motion commands to a flight controller 10 which controls several actuators 11 accordingly, wherein the actuators 11 adjust, for example, the rudders of the unmanned aerial vehicle 1 according to the motion commands received from the remote control unit 2.

Further, the unmanned aerial vehicle 1 comprises several onboard sensors 12 for measuring flight data, e.g. altitude, air speed. These flight data are provided to the flight controller 10 which is considering these flight data when controlling the actuators 11.

Moreover, the unmanned aerial vehicle 1 comprises onboard vestibular sensors 13 measuring vestibular data of the unmanned aerial vehicle 1, e.g. pitch angle, roll angle and yaw angle of the unmanned aerial vehicle 1. The vestibular data measured by the onboard vestibular sensors 13 are also provided to the flight controller 10 which is considering the vestibular data when controlling the actuators 11.

Further, the flight data measured by the sensors 12 and the vestibular data measured by the vestibular sensors 13 are provided to a transceiver 14 which is transmitting these flight data including the vestibular data via the wireless radio communication link 3 to a receiver 15 in the remote control unit 2.

The vestibular data are provided to a controller 16 via a filter 17 wherein the filter 17 ensures that the vestibular data do not result in a vestibular feedback violating safety restrictions and mechanical restrictions.

The other flight data are provided directly to the controller 16.

Figure 3:
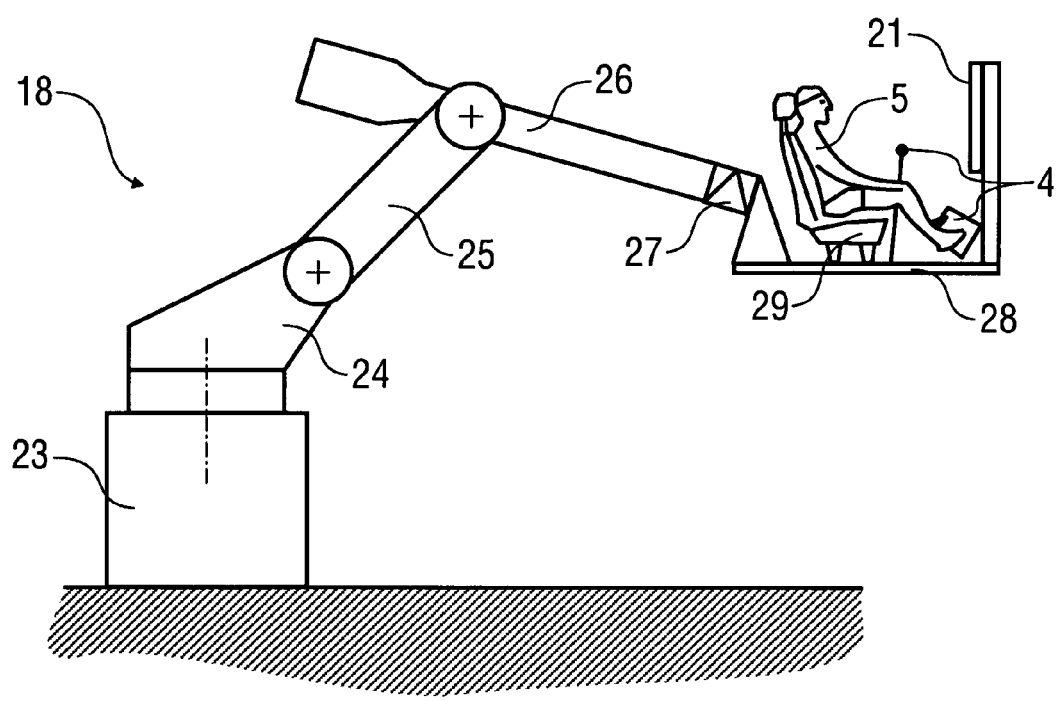
FIG. 3 shows a perspective view of a multi-axis serial robot carrying the operator so that the robot provides the vestibular feedback to the operator.

The controller 16 controls a multi-axis serial robot 18 as shown in FIG. 3 wherein the robot 18 carries the operator 5 so that the robot 18 can provide a vestibular feedback to the operator 5. Therefore, the controller 16 controls the robot 18 in such a way that the operator 5 is subjected to a motion which is substantially identical with the real motion of the unmanned aerial vehicle 1 as represented by the vestibular data measured by the vestibular sensors 13. Therefore, the vestibular feedback provided to the operator 5 by the robot 18 significantly improves the situational awareness of the operator 5 during remote control of the unmanned aerial vehicle 1.

Further, the controller 16 controls a force feedback device 19 and an acoustic feedback device 20 in a conventional way to further enhance the situational awareness of the operator 5 during remote control of the unmanned aerial vehicle 1.

Moreover, the remote control unit 2 comprises a visual feedback device 21 which is also controlled by the controller 16 and carried by the robot 18. The visual feedback device 1 provides a visual feedback to the operator 5 during remote control of the unmanned aerial vehicle 1. In one embodiment of the invention, the visual feedback provided by the visual feedback device 21 is an image stream generated by an onboard camera in the unmanned aerial vehicle 1. In another embodiment of the invention, the visual feedback provided by the visual feedback device 21 to the operator 5 is a virtual scenery calculated by the controller 16 on the basis of the vestibular data measured by the onboard vestibular sensors 13 in the unmanned aerial vehicle 1.

Figure 2:
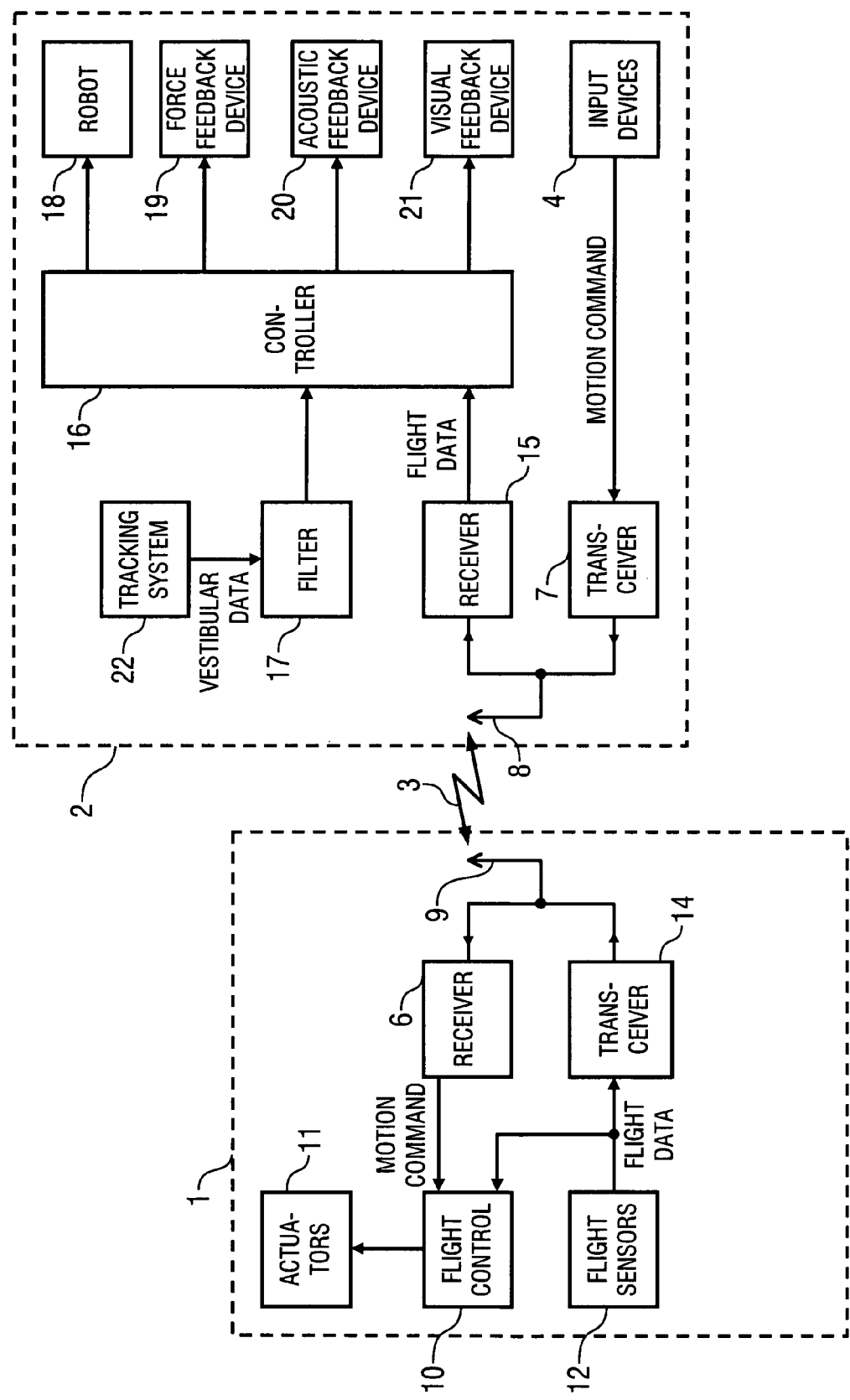
FIG. 2 is an alternative embodiment of a teleoperation system similar to FIG. 1 wherein the vestibular data needed for providing the vestibular feedback are measured by a fixed motion tracking system.

FIG. 2 shows an alternative embodiment similar to the embodiment according to FIG. 1 so that reference is made to the above description, wherein the same reference numerals are used for corresponding parts and details.

One characteristic feature of this embodiment is that the vestibular data representing the real motion of the unmanned aerial vehicle 1 are not measured by onboard vestibular sensors 13 but by a motion tracking system 22 which is associated to the remote control unit 2.

Finally, FIG. 3 shows a schematic view of the multi-axis robot 18 providing the vestibular feedback to the operator 5.

The robot 18 comprises a fixed robot base 23 and several robot links 24, 25, 26 connected by joints, wherein the distal link 26 carries a robot wrist 27 on which a platform 28 is mounted. The platform 28 carries a seat 29 with the operator 5, wherein the operator 5 can handle the input device 4 in the form of a control stick. Further, the visual feedback device 21 in the form of a video screen is arranged in the visual field of the operator 5 so that the operator 5 views the visual feedback provided by the visual feedback device 21.

Although the invention has been described with reference to the particular arrangement of parts, features and the like, these are not intended to exhaust all possible arrangements of features, and indeed many other modifications and variations will be ascertainable to those skilled in the art.

LIST OF REFERENCE NUMERALS

1 Unmanned aerial vehicle
2 Remote control unit
3 Wireless radio communication link
4 Input devices
5 Operator
6 Receiver
7 Transceiver
8 Antenna
9 Antenna
10 Flight controller
11 Actuators
12 Sensors
13 Vestibular sensors
14 Transceiver
15 Receiver
16 Controller
17 Filter
18 Robot
19 Force feedback device
20 Acoustic feedback device
21 Visual feedback device
22 Motion tracking system
23 Robot base
24 Link
25 Link
26 Link
27 Robot wrist
28 Platform
29 Seat

The invention claimed is:

1. Teleoperation method for remote control of a machine by a human operator using a remote control unit, comprising the following steps:
   determining vestibular data representing the motion of the machine,
   determining a vestibular feedback on the basis of the vestibular data of the machine, wherein the vestibular feedback represents the real motion of the machine,
   providing said vestibular feedback to the operator to enhance situational awareness of the operator,
   filtering said vestibular data,
   determining said vestibular feedback on the basis of said filtered vestibular data, wherein said filtering of said vestibular data ensures that said vestibular feedback complies with safety restrictions or mechanical restrictions of a robot carrying the operator so that a collision of the remote controlled machine with another flying object or with the ground is not reproduced by the vestibular feedback, and
   providing said vestibular feedback to the operator by a multi-axis serial manipulator comprising several links connected by joints.

2. The teleoperation method according to claim 1, further comprising the following step:

a) Subjecting the operator to a motion corresponding to the motion of the remote-controlled machine, wherein the motion of the operator provides the vestibular feedback and is generated according to the vestibular data of the remote-controlled machine.

3. Teleoperation method according to claim 2, further comprising the following steps for determining the vestibular data:
a) Measuring the vestibular data by onboard sensors of the remote-controlled machine, and
b) Transmitting the measured vestibular data from the remote-controlled machine to the remote control unit for providing the corresponding vestibular feedback to the operator.

4. Teleoperation method according to claim 3, wherein the onboard sensors are selected from a group consisting of:
a) Gyroscopes, and
b) Accelerometers.

5. Teleoperation method according to claim 2, further comprising the following step for determining the vestibular data:
Remote measuring the vestibular data of the remote-controlled machine by a motion tracking system, so that it is not necessary to transmit the vestibular data from the remote-controlled machine to the remote control unit.

6. Teleoperation method according to claim 1, comprising the following step:
Providing a visual feedback to the operator, wherein the visual feedback represents the motion of the remote-controlled machine.

7. Teleoperation method according to claim 6, comprising the following steps for providing the visual feedback to the operator:
a) Calculating a virtual scenery on the basis of the vestibular data, and
b) Displaying the virtual scenery to the operator.

8. Teleoperation method according to claim 6, comprising the following steps for providing the visual feedback to the operator:
a) Generating images from a perspective of the remote-controlled machine by means of an onboard camera,
b) Transmitting the images from the remote-controlled machine to the control unit, and
c) Displaying the images to the operator.

9. Teleoperation method according to claim 1, wherein the vestibular data comprise the following data:
a) Attitude of the remote-controlled machine, namely pitch angle, roll angle and yaw angle of the remote-controlled machine,
b) Speed of the remote-controlled machine, namely temporal changes of the pitch angle, the roll angle and the yaw angle of the remote-controlled machine, and
c) Accelerations of the remote-controlled machine, namely accelerations of the pitch angle, the roll angle, the yaw angle and the linear coordinates of the remote-controlled machine.

10. Teleoperation method according to claim 1, wherein the remote-controlled machine is selected from a group consisting of:
a) an unmanned aerial vehicle,
b) an unmanned ground vehicle,
c) an underwater vehicle,
d) a nanorobot which is adapted to move through the body of an animal being,
e) a spacecraft, and
f) an unmanned ground combat vehicle.

11. Teleoperation method according to claim 1, wherein a multi-sensory feedback is provided to the operator comprising the following types of feedback in addition to the vestibular feedback:
a) a visual feedback, wherein the visual feedback preferably represents a perspective of the remote-controlled machine,
b) an acoustical feedback, and
c) a haptic and force feedback.

12. Teleoperation method according to claim 1, further comprising the following steps:
a) Generating motion commands at the remote control unit, wherein the motion commands define a desired motion of the remote-controlled machine,
b) Transmission of the motion commands from the remote control unit to the remote-controlled machine, and
c) Deriving the vestibular data from the motion commands which are sent from the remote control unit to the remote-controlled machine.

13. Human robot interface for remote control of a remote-controlled machine by a human operator using a remote control unit, wherein
the human robot interface provides a vestibular feedback to the operator to enhance the situational awareness of the operator,
the vestibular feedback represents a motion of the remote-controlled machine,
the interface comprising
a filter for filtering vestibular data, so that the vestibular feedback is determined on the basis of said filtered vestibular data, wherein the filtering of said vestibular data ensures that said vestibular feedback complies with safety restrictions or mechanical restrictions of a robot carrying the operator so that a collision of the remote controlled machine with another flying object or with the ground is not reproduced by the vestibular feedback, and
a multi-axis serial manipulator for providing the vestibular feedback, wherein the multi-axis serial manipulator comprises several links connected by joints.

14. Human robot interface according to claim 13, comprising
a) a receiver for receiving vestibular data from the remote-controlled machine, where the vestibular data are determined by onboard sensors,
b) a controller for determining the vestibular feedback on the basis of the vestibular data received from the remote-controlled machine,
c) a vestibular feedback device for providing the vestibular feedback to the operator.

15. Human robot interface according to claim 13, wherein the robot carries at least one of the following components:
a) A visual feedback device,
b) an acoustic feedback device providing an acoustic feedback to the operator,
c) a haptic feedback device and a force feedback device providing a haptic feedback to the operator,
d) a seat for the operator, and
e) an input device for controlling the motion of the remote-controlled machine.

16. Human robot interface according to claim 14, comprising a wireless link between the remote-controlled machine and the remote control unit for transmitting the vestibular data from the remote-controlled machine to the remote control unit and for transmitting motion commands from the remote control unit to the remote-controlled machine.

17. Human robot interface according to claim 13, wherein the remote-controlled machine is selected from a group consisting of:
   a) an unmanned aerial vehicle,
   b) an unmanned ground vehicle,
   c) an underwater vehicle, and
   d) a spacecraft.

18. A method of using the human robot interface according to claim 13 for one of the following purposes:
   a) Training of pilots of vehicles,
   b) Remote control of unmanned vehicles,
   c) Remote control of a swarm of unmanned aerial vehicles, and
   d) Navigating of a nanorobot through a body of a human being.

19. Human robot interface according to claim 13, wherein
   a) the remote control unit comprises an input device, so that the operator can input motion commands at the input device, wherein the motion commands define a desired motion of the remote-controlled machine,
   b) the remote control unit comprises a transceiver adapted for transmitting the motion commands from the remote control unit to the remote-controlled machine, and
   c) the remote control unit comprises a processing unit adapted for deriving the vestibular data from the motion commands which are sent from the remote control unit to the remote-controlled machine.

\* \* \* \* \*